United States Patent [19]

Advani et al.

[11] 4,053,710
[45] Oct. 11, 1977

[54] AUTOMATIC SPEAKER VERIFICATION SYSTEMS EMPLOYING MOMENT INVARIANTS

[75] Inventors: Jeram G. Advani, Dayton; Bruno J. Paganini, Centerville; William J. Hale, Kettering, all of Ohio

[73] Assignee: NCR Corporation, Dayton, Ohio

[21] Appl. No.: 662,994

[22] Filed: Mar. 1, 1976

[51] Int. Cl.$^2$ ............................................. G10L 1/04
[52] U.S. Cl. ................................................. 179/1 SB
[58] Field of Search ............ 179/1 SB; 340/15.5 CC, 340/15.5 TA, 146.3 WD, 149 R

[56] References Cited

U.S. PATENT DOCUMENTS

| | | | |
|---|---|---|---|
| 3,466,394 | 9/1969 | French | 179/1 SB |
| 3,700,815 | 10/1972 | Doddington | 179/1 SB |
| 3,705,384 | 12/1972 | Wahlberg | 340/149 R |
| 3,919,479 | 11/1975 | Moon | 179/1 SB |

OTHER PUBLICATIONS

S. Pruzanski and M. Mathews, "Talker-Recognition Procedure," J. of Ac. Soc. Am., Nov. 1964.
M. K. Hu, "Visual Pattern Recognition by Moment Invariants," IRE Trans. on Info. Theory, Feb. 1962.

*Primary Examiner*—Kathleen H. Claffy
*Assistant Examiner*—E. S. Kemeny
*Attorney, Agent, or Firm*—J. T. Cavender; Albert L. Sessler, Jr.; Elmer Wargo

[57] ABSTRACT

An electrical voice print is converted into sampled digital values which are converted into corresponding moment invariants (MI). A comparison of the moment invariant values of a standard phrase uttered by the same person and stored in the storage means against the most recently converted moment invariants determines the degree of correlation. A high degree of correlation is indicative of a voice match.

16 Claims, 13 Drawing Figures

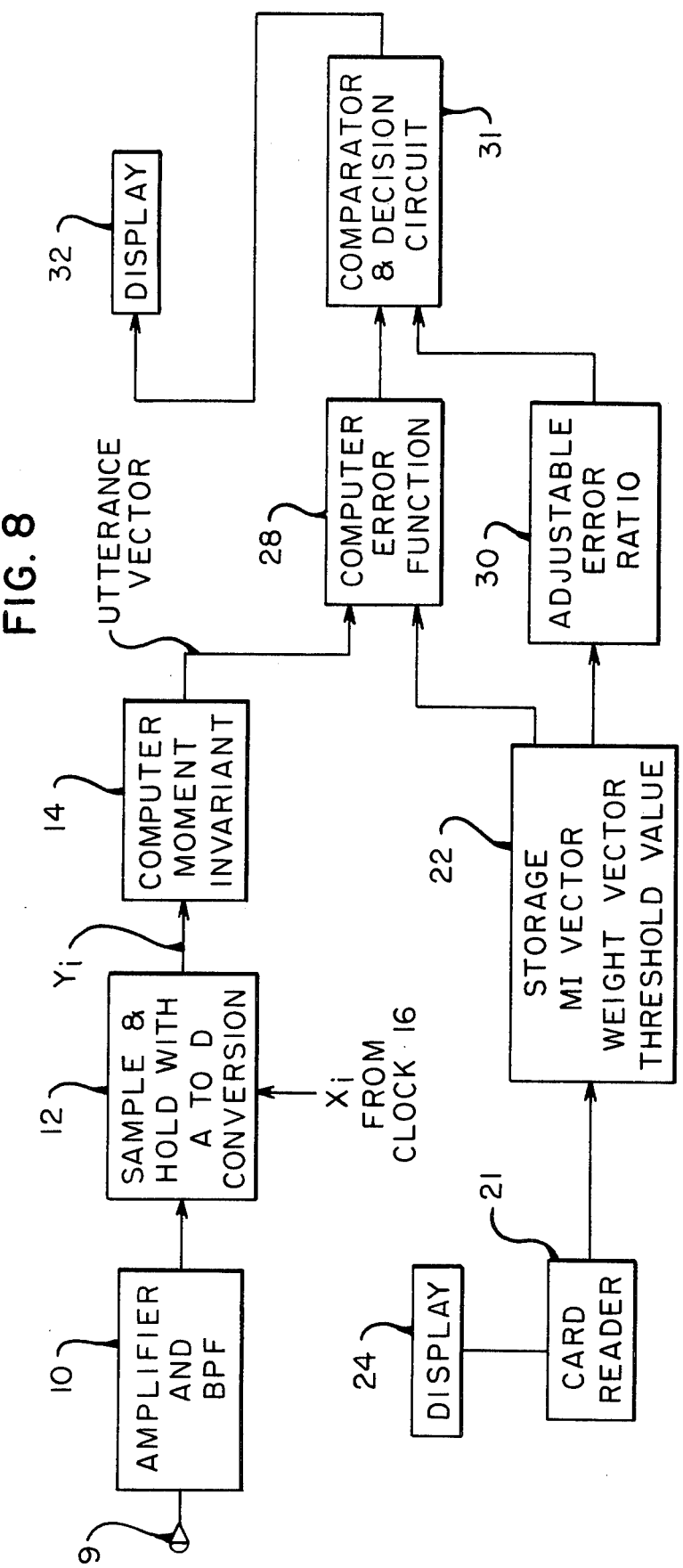

AUTOMATIC SPEAKER VERIFICATION SYSTEMS EMPLOYING MOMENT INVARIANTS

BACKGROUND OF THE INVENTION

The present invention relates generally to the field of voice recognition and more specifically to a system and methodology for verifying a speaker by comparing a selected utterance of the speaker against a previously recorded selected utterance by the same speaker utilizing computed moment invariants of the selected utterance for comparison purposes.

The tranaction of authorizing advances of money, transfer of funds, and the granting of credit, along with other associated business transactions, have reached the point where a credit card or other form of indicia, carrying magnetically encoded information, is used by a customer to activate an unattended business machine, for example, a teller terminal. A number of safeguards have been built into these systems to insure that the customer is indeed the rightful owner of the card and as such has the authorized use of the business machine. One type of system in present use is activated by magnetically encoded credit card and verification is accomplished by having the customer key into the terminal a secret number which number was assigned to the customer at the time the card was issued. The business system compares the secret number entered by the customer against a corresponding number that is encoded on the card itself or stored in a central computer location. A correspondence in number entered and number recorded permits the customer to have access to the machine.

Another prior art system utilizes a fingerprint comparison by having the customer position his finger or hand over a scanner which in turn causes the scanner to generate signals indicative of certain key features of the customer's fingerprint, which key features are checked against recorded key features on a customer's credit, or access card.

A particularly interesting type of system is one wherein the customer's voice is used to provide the verification of his identity. Prior art systems that operate by having the customer speak a verification phrase for comparison against a prior recorded reference phrase have been developed. The reference phrase may be recorded on a credit card or within the system.

A number of techniques have been developed in order to ascertain the reliability of the verification. A typical voice recognition system is described in U.S. Pat. No. 3,509,280 entitled "Adaptive Speech Pattern Recognition System", by J. W. Jones, and in U.S. Pat. No. 3,649,765 entitled "Speech Analyzer-Synthesizer System Employing Improved Format Extractor", by L. R. Rabiner et al.; and in U.S. Pat. No. 3,700,815 entitled "Automatic Speaker Verification by Non-Linear Time Alignment Of Acoustic Parameters", by G. R. Doddington et al. Additional systems are disclosed in U.S. Pat. No. 3,812,291 entitled "Signal Pattern Encoder And Classifier" Brodes et al. and in U.S. Pat. No. 3,816,722 entitled "Computer For Calculating The Similarity Between Patterns And Pattern Recognition Systems Comprising The Similarity Computer", by Sakoe et al. Some publications of interest for showing the state of the art are "Experimental Studies In Speaker Verification, Using An Adaptive Sytem", by K. P. Li et al.; Journal of the Acoustical Society of America Vol. 40, No. 5, 1966, pp. 966–978; "Automatic Speaker Verification Using Cepstral Measurements", by J. E. Luck, Journal of the Acoustical Society of America, Vol. 46, No. 4 (part 2) 1969, pp. 1026–1029; "Pattern Matching Procedure For Automatic Talker Recognition", by S. Pruzansky, Journal of Acoustical Society of America, Vol. 35, No. 3, pp. 354–358; and "Visual Pattern Recognition By Moment Invariants", by Ming-Kuei Hu, IRE Transactions On Information Theory, 1962, pp. 179–187.

The last named article establishes a theorem which is useful for visual pattern recognition of geometrical patterns and alphabetical characters, independently of position, size and orientation. The present invention utilizes select modifications of this theorem to implement a system for recognizing and verifying the standardized utterance of a cooperative speaker.

SUMMARY OF THE INVENTION

The present system converts an utterance into a corresponding set of moment invariants. A number of independent utterances of the same phrase by the same person are used to compile a plurality of sets of moment invariants each corresponding to an utterance vector.

An average utterance vector may then be computed using the sets of computed moment invariants.

A means for comparing the average utterance vector against a later obtained utterance vector will provide verification of the speaker.

Errors in acceptance of an imposter speaker may be minimized by utilizing sets of moment invariants derived from groups of cooperative imposters. By matching the utterance of the unverified person against the sets of moment invariants computed and stored for the group corresponding to the closest match with respect to age and sex of the unverified person a degree of correlation may be fixed and threshold determined for setting the acceptance level.

It is therefore a primary object of the present invention to provide a novel voice verification system.

It is a further object of the present invention to provide a verification system which utilizes moment invariants computed from the utterance of a reference phrase.

Another object of the present invention is to provide a system for converting a cooperative individual's utterance of a standard phrase into select parameters which are subject to storage and comparison.

These and other objects of the present invention will become more apparent and better understood when taken in conjunction with the following description and drawings wherein like characters indicate like parts and which drawings form a part of this specification.

BRIEF DESCRIPTION OF THE DRAWINGS

FIG. 8 illustrates a system useful in conjunction with the system of FIG. 1 for verifying a speaker through the acceptance or rejection of an utterance.

DESCRIPTION OF THE PREFERRED EMBODIMENT

Figure 1:
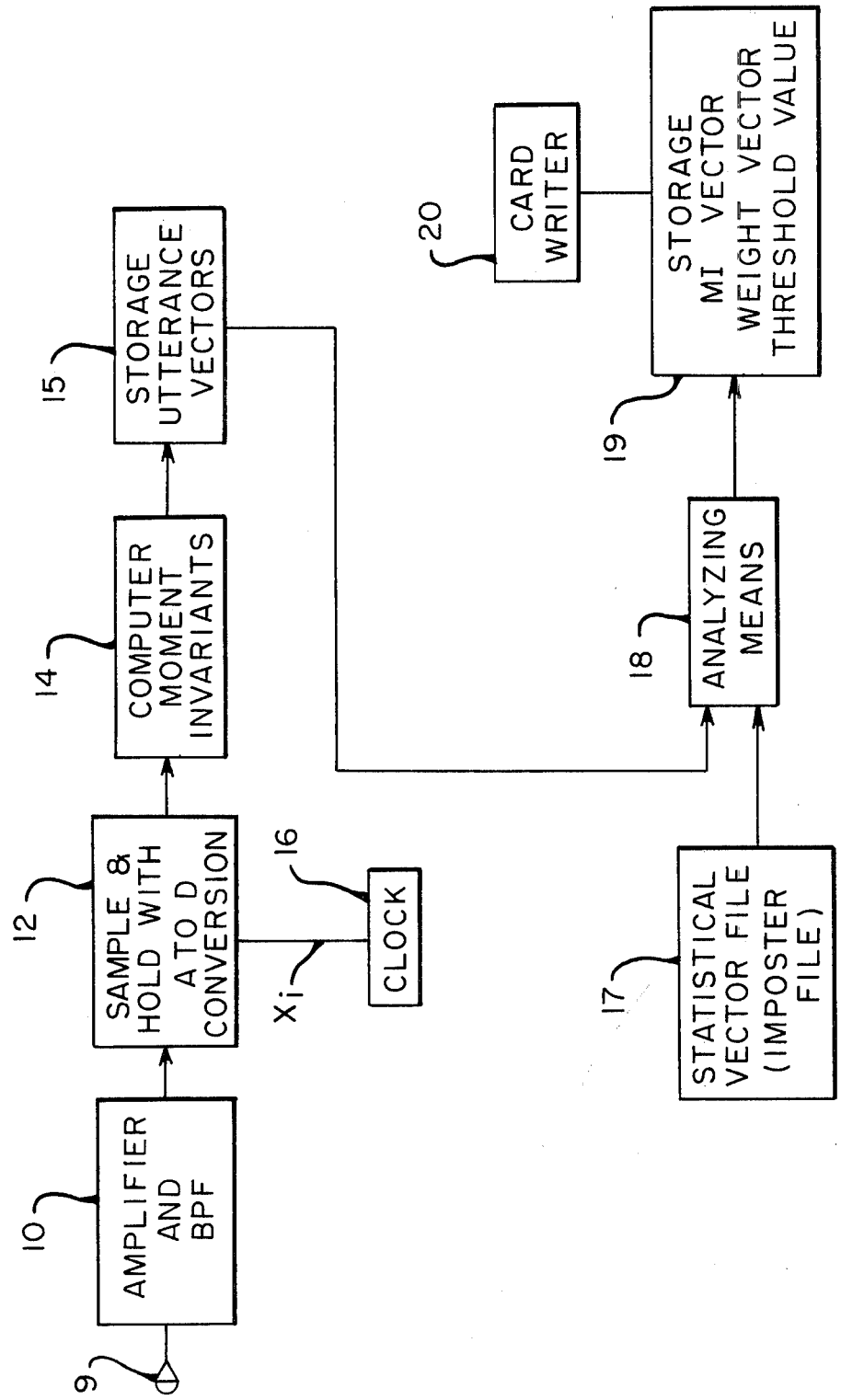
FIG. 1 is a block diagram of a system for generating utterance related moment invariants in accordance with the teachings of the present invention.

FIG. 1 illustrates in block diagram form a system for establishing a voice standard for a customer. The customer speaks a standard phrase into a microphone 9. Throughout this preferred embodiment the standard phrase used is (we go away). Within block 10 is contained an amplified and bandpass filter the bandpass of which is 130Hz to 3500 Hz. The output from block 10 is an electrical signal having an amplitude characteristic proportional to the sound detected by the microphone 9.

Figure 2:
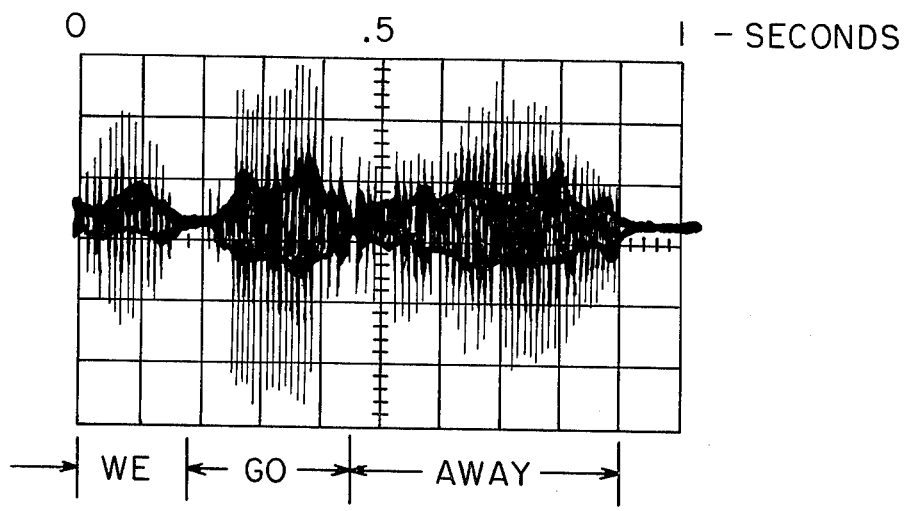
FIG. 2 illustrates a waveform corresponding to a reference utterance.

FIG. 2 illustrates the type of signal appearing at the output of block 10. Block 12 receives the electrical signal from block 10 along with a sampling signal $x_i$ from a clock source 16. Block 12 operates to sample the input signal at periods corresponding to $x_i$.

Figure 3:
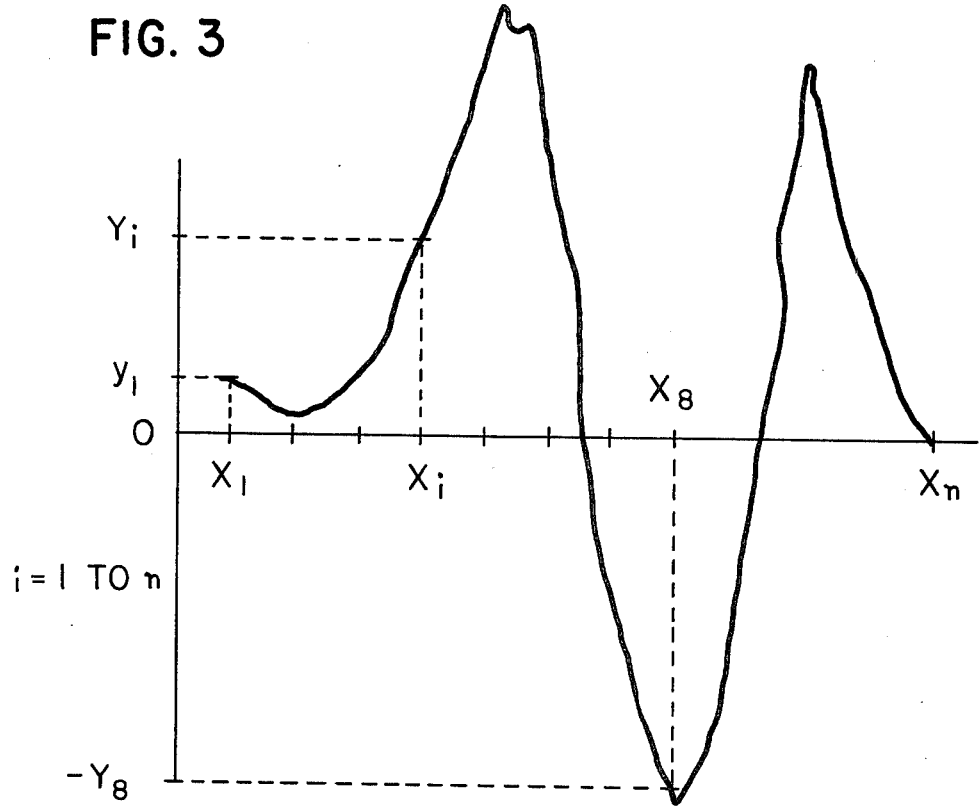
FIG. 3 illustrates an enlarged section of the waveform shown in FIG. 2 sampled at selected intervals.

FIG. 3 illustrates an enlarged portion of the waveform shown in FIG. 2, with sampling times and amplitudes superimposed. For example at sampling time $x_i$ the amplitude sampled in Yi. These amplitude signals are converted to digital signals by an analog to digital converter within the sample block 12. The digital equivalents of the samples are labeled $y_i$. The utterance of the phrase "we go away" takes approximately 0.8 to 1.2 seconds. The sampling rate $x_i$ in the preferred embodiment was 10K samples/second. Therefore taking a rough approximation there are approximately 10,000 amplitude samples $y_i$ for each uttered phrase. A group of moment invariants are computed for the particular uttered phrase by using a computer means 14. A moment invariant for a two dimensional waveform (pattern) as used in this specification is defined as a measurement, derived from the moment ($\int\int_A x^p y^q d_x d_y$) of the waveform, which is independent of the waveform position and also independent of the waveform size along the $x$ and $y$ directions. The quantities $p$ and $q$ in the aforementioned definition are positive integers. In the preferred embodiment 23 moment invariants are computed for each utterance phrase utilizing the following moment invariant equation.

The two-dimensional $(p+q)$th order moment invariants are computed as, $$MI_{pq} = \frac{\frac{1}{N}\sum_{i=1}^{N}(xi-\bar{x})^p(yi-\bar{y})^q}{\left[\frac{1}{N}\sum_{i=1}^{N}(xi-\bar{x})^2\right]^{p/2}\left[\frac{1}{N}\sum_{i=1}^{N}(yi-\bar{y})^2\right]^{q/2}} \quad \text{[Eq. 1]}$$

where, $N$ = number of samples $yi$ = digitized value of input signal sampled at $xi$ $\bar{x}$ and $\bar{y}$ are the mean values of the distribution of $x_i$ and $y_i$ respectively.

The moment invariants, of order $p+q \leq 6$, are computed for each sample utterance to form the Utterance Vectors for an individual. The values $p$ and $q$ are each integers with the magnitude 6 being chosen by empirical means.

The computed moment invariants are stored within a storage device 15 which may, for example, be computer memory. In order to establish a useable standard it may be necessary to have the speaker speak a number of utterance phrases. It has been found that 10 similar phrases repeated by the speaker provide a highly reliable standard when the moment invariants associated with these phrases are averaged. Such being the case, the speaker is then required to restate the reference utterance nine additional times, resulting in the storage of nine additional groups of 23 moment invariants within the storage means 15.

Figure 4A:
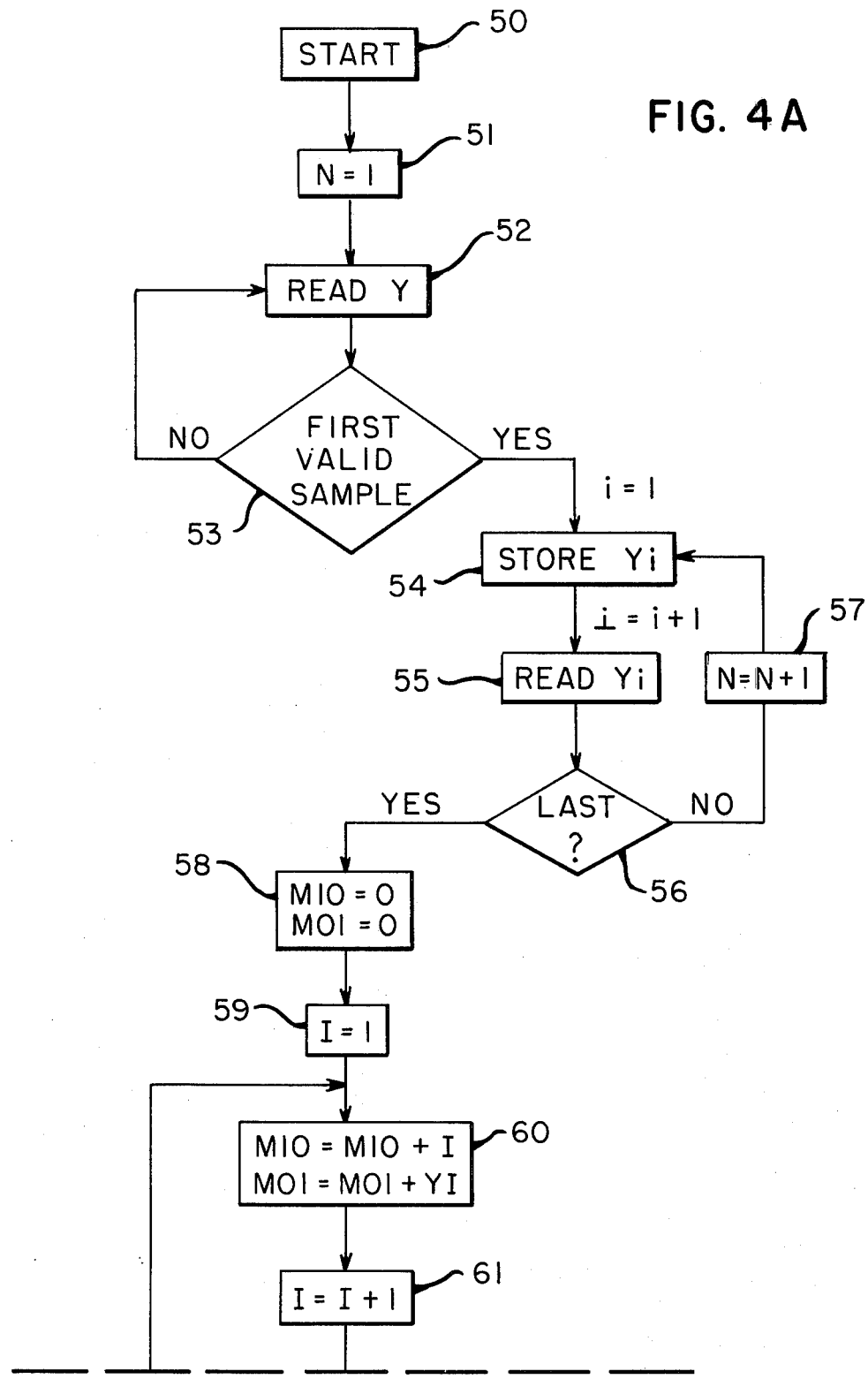
FIGS. 4A, 4B and 4C illustrate in flow diagram form the operation of a portion of the system illustrated in FIG. 1.
Figure 4B:
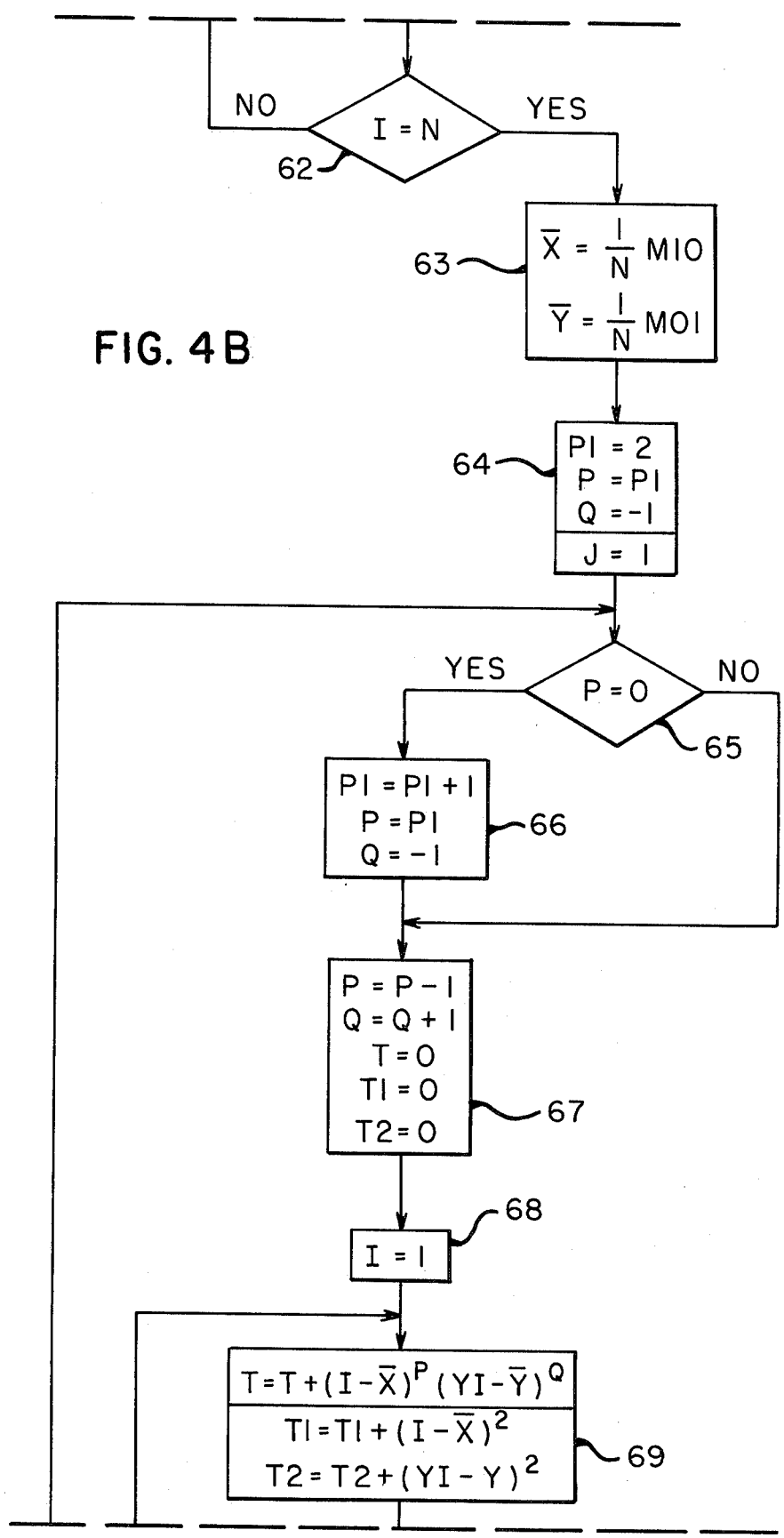
Figure 4C:
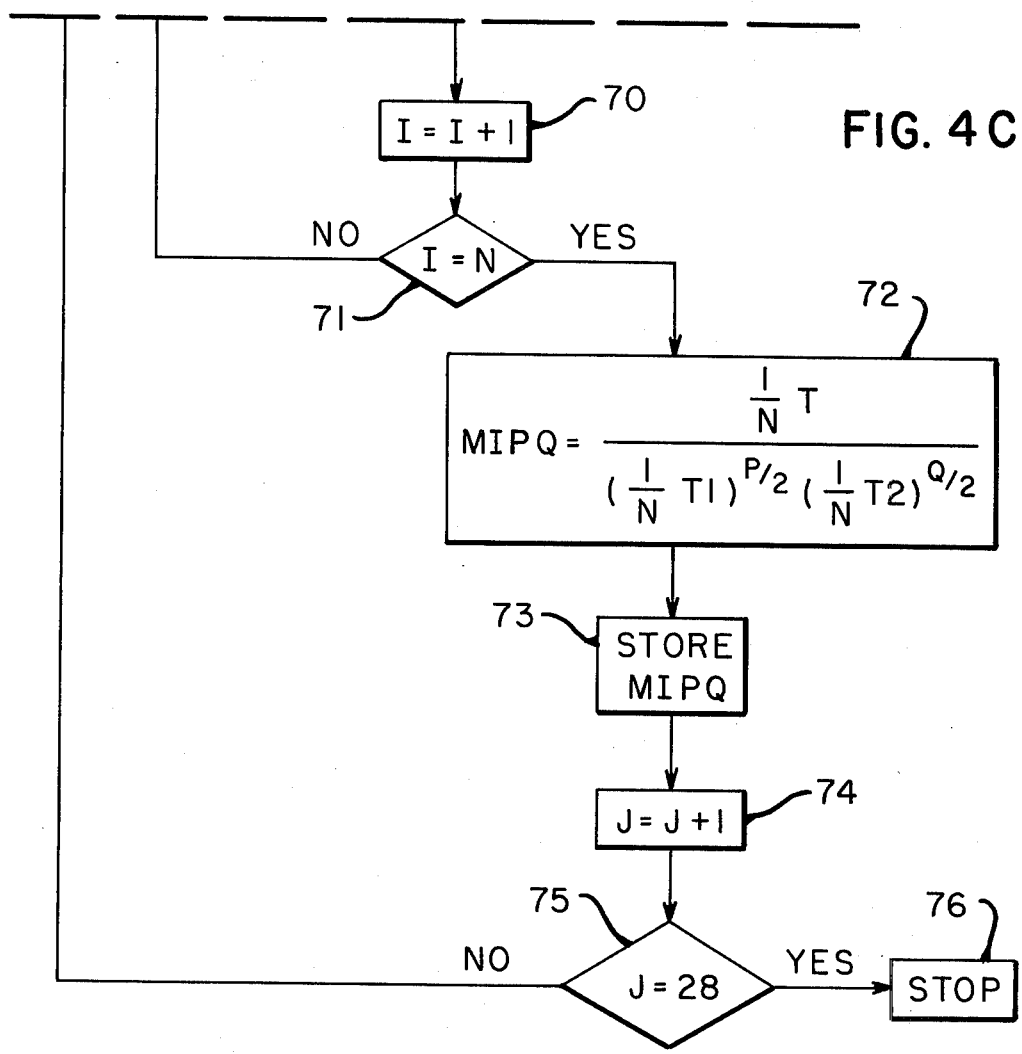

FIGS. 4A to 4C illustrate in flow chart form the method used by the computer means 14 to compute moment invariants based on Eq. 1.

Throughout the specification the quantities $i$, $j$, $p$, $q$, $x$ and $y$ are printed in lower case. The drawings have these same quantities shown in upper case in order to conform to the accepted standard associated with flow chart printing. It will be understood by those persons skilled in the art that these quantities are the same even though they are shown printed in different case levels.

The START block 50 commences the reading of the samples $y_i$ stored in the computer 14. A number of initial samples may not be related to the spoken utterance but may be due to noise or other extraneous signals. A threshold level is chosen which insures that the first sample and the samples following are in fact, true samples of the spoken utterance. Block 51 sets N equal to 1, which causes block 52 to read the sample $y$. The action diamond 53 compares the sample $y$ to the selected threshold level to determine if the sample just read is in fact that valid sample $y_1$. If the comparison results in a NO response the next $y$ sample is read and compared against the threshold with the comparison process continuing until a YES response is received.

The sample is identified as $y_1$ by setting $i=1$ and the sample is stored in block 54. The operation of block 54 increments $i$ by 1 and directs block 55 to read the next sample, which is identified as $y_2$. Action block 56 compares the $i^{th}$ term to a preselected limit for the $i^{th}$ term to determine if the particular $y_i$ sample being read by block 55 is the last sample required. If the answer is NO the N block 57 is incremented by 1 and the just read sample $y_i$ is stored; if the answer is YES the action block causes block 58 to set the moment invariants $M_{10}$ and $M_{01}$ to initial conditions where each is equal to zero. Block 59 sets $i$ equal to 1 which in turn activates block 60 commencing the computation of $M_{10}$ and $M_{01}$. Block 61 increments the latest value of $i$ by 1. Block 62 compares the incremented value of $i$ against the stored value of N to determine if they are equal. If the answer is NO another computation of $M_{10}$ and $M_{01}$ is made; if the answer is YES then the values of $\bar{x}$ and $\bar{y}$ are computed by the operation shown in block 63.

The block 64 sets the initial values of $pl$, $p$, $q$ and $j$. The action block 65 evaluates the value of $p$ to determine if it is zero. If not the computations proceed to block 67 where the values $p$ and $q$ are decremented and incremented by 1 respectively and wherein the values of T, T1 and T2 are set to zero. Block 68 sets the value $i$ to 1. In block 69 the computations of the values of T, T1 and T2 are performed. The block 70 increments the value $i$ by 1 at the completion of each computation by block 69. The comparison block 71 compares $i$ to N with a NO response re-activating block 69 for computation of the $i$ incremented values of T, T1 and T2. When $i$ is equal to N all of the required computations by block 69 have been completed.

Block 72, using the values of T, T1 and T2 computes the moment invariants $MI_{pq}$ which are stored by block 73 in the computer 14. The block 74 increments the value of $j$ by 1. If $j$ does not equal 28, the program moves to block 65 where the value of $p$ is again compared to zero. If $p$ is equal to zero the program is directed to block 66 wherein the value of $pl$ is incremented by 1 and $p$ is made equal to $pl$ and the value of $q$ is made equal to $-1$. From block 66 the program moves to block 67.

If the count of $j$ is equal to 28, as determined by block 75, the program sequence moves to block 76 and stops.

When completed, 23 moment invariants $MI_{pq}$ are stored within the storage means 15. The moment invariants $M_{10}$, $M_{01}$, $M_{20}$ and $M_{02}$ are constant for all persons and therefore are not saved.

A statistical vector file 17 (FIG. 1) which may be a read only memory is used to store 100 or more moment invariant sets computed from the reference utterances of groups of persons of different ages and sexes. These sets of moment invariants constitute an "Imposter file". The age and sex of the customer determines which corresponding set of imposter moment invariants are going to be used for analysis. An analyzing means 18 receives the stored utterance vectors from block 15 and compares these against the imposter vectors from the statistical file 17.

The analyzer 18 compares the customer's Utterance Vectors and the imposter Utterance Vectors to arrive at a Weight Vector. The Weight Vector for the particular customer is stored in the storage unit 19. The analyzer operates upon the Utterance Vectors (one for each utterance) obtained from "$n$" repeated utterances of a phrase, spoken by a new customer "$k$", and "$m$" Statistical Utterance Vectors from the file 17 obtained from persons considered as typical imposters for the person "$k$". The value for "$m$" used in the preferred embodiment was 100. That is 100 imposter Utterance Vectors were computed and stored in file 17.

The analyzer 18 computes the average moment invariants for the Utterance Vectors from 15 as follows:

$$\overline{MI}_{i,k} = \frac{1}{n} \sum_{j=1}^{n} MI_{i,j,k} \qquad [\text{Eq. 2}]$$

$i = 1$ to 23, for the sequential ordering of $p+q = 6$. The errors, that is the differences between each of the customer's Utterance Vectors stored in unit 15 and the average moment invariant computed in Eq. 2, are computed as follows:

$$E_{k,j} = \sum_{i=1}^{23} C_{i,k}(MI_{i,j,k} - \overline{MI}_{i,k})^2, \text{ for } j = 1 \text{ to } n \qquad [\text{Eq. 3}]$$

The errors between each of the Statistical Utterance Vectors for a particular class, and the average moment invariant computed in Eq. 2, are computed as follows:

$$E_{h,l} = \sum_{i=1}^{23} C_{i,k}(MI_{i,l,h} - \overline{MI}_{i,k})^2, \text{ for } l = 1 \text{ to } m \qquad [\text{Eq. 4}]$$

where,
  $h$ denotes the Statistical Vector file
  $C_{i,k}$ in Eqs. 3 and 4, is the weight for the $i^{th}$ component of the moment invariant vector. The $C_{i,k}$ coefficients constitute the Weight Vector for the person $k$.

The $C_{i,k}$ coefficients are determined in such a way that $E_{k,j}$ is minimized and $E_{h,l}$ is maximized for all $j$ and $l$.

Denoting $(MI_{i,j,k} - \overline{MI}_{i,k})^2$ by $A_{i,j,k}$ and $(MI_{i,l,h} - \overline{MI}_{i,k})^2$ by $B_{i,l,h}$, Eqs. 3 and 4 reduce to the following form:

$$E_{k,j} = \sum_{i=1}^{23} C_{i,k} \cdot A_{i,j,k}, \text{ for } j = 1,n \qquad [\text{Eq. 5}]$$

and $$E_{h,l} = \sum_{i=1}^{23} C_{i,k} \cdot B_{i,l,h}, \text{ for } l = 1,m \qquad [\text{Eq. 6}]$$

The minimization of $E_{k,j}$ (for all $j$) and maximization of $E_{h,l}$ (for all $l$) is accomplished by minimizing each component, $C_{i,k} \cdot A_{i,j,k}$ (for all $j$), of $E_{k,j}$ and simultaneously maximizing each component $C_{i,k} \cdot B_{i,l,h}$ (for all $l$), of $E_{h,l}$.

Figure 6:
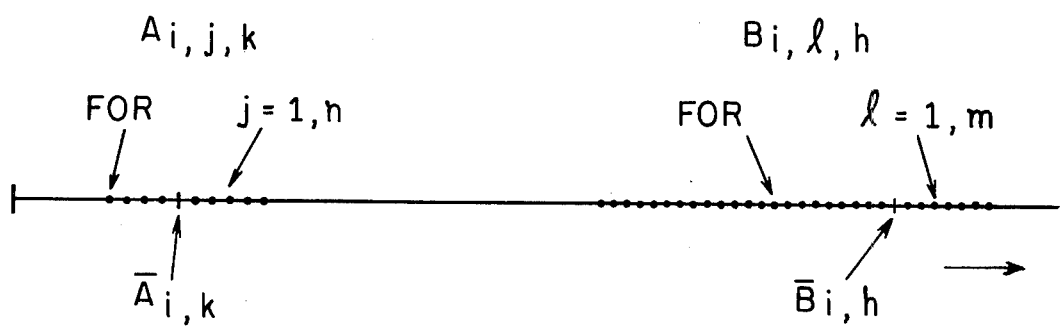
FIG. 6 illustrates the distribution of computed terms used in the invention.

The $i^{th}$ component values for $A_{i,j,k}$ ($j = 1,n$) and $B_{i,l,h}$ ($l = 1,m$) are plotted in FIG. 6, which also shows:

$$\overline{A}_{i,k} = \frac{1}{n} \sum_{j=1}^{n} A_{i,j,k} \qquad [\text{Eq. 7}]$$

and $$\overline{B}_{i,h} = \frac{1}{m} \sum_{l=1}^{m} B_{i,l,h} \qquad [\text{Eq. 8}]$$

It is observed from FIG. 6, that the $i^{th}$ component of $E_{k,j}$ [Eq. 5] will be minimized and that of $E_{h,l}$ [Eq. 6] will be maximized if $\overline{B}_{i,h} - \overline{A}_{i,k}$ is large and if points $A_{i,j,k}$ (for all $j$) are close to $\overline{A}_{i,k}$ and points $B_{i,l,h}$ (for all $l$) are close to $\overline{B}_{i,h}$. Thus a separation function:

$$S_{i,k} = \frac{\overline{B}_{i,h} - \overline{A}_{i,k}}{\sigma_{i,h} + \sigma_{i,k}}, \qquad [\text{Eq. 9}]$$

where $\sigma_{i,k}$ and $\sigma_{i,h}$ are standard deviations of $A_{i,j,k}$ ($j = 1,n$) and $B_{i,l,h}$ ($l=1,m$) respectively, would be a suitable value for $C_{i,k}$ in order to minimize $E_{k,j}$ (for all $j$) and maximize $E_{h,l}$ (for all $l$). The value of $S_{i,k} = 0$ is chosen for the case when $\overline{B}_{i,h} < \overline{A}_{i,k}$, for the obvious reason that the $i^{th}$ component of $E_{h,l}$ (for several values of $l$) will be less than the corresponding component of $E_{k,j}$ (for a few values of $j$).

$$S_{i,k} = 0 \qquad \text{for } \overline{B}_{i,h} < \overline{A}_{i,k} \qquad [\text{Eq. 10}]$$
$$= \frac{\overline{B}_{i,h} - \overline{A}_{i,k}}{\sigma_{i,h} + \sigma_{i,k}} \text{ otherwise}$$

To account for the relative magnitudes of $\overline{A}_{i,k}$ for different $i$, $S_{i,k}$ is further normalized by $\overline{A}_{i,k}$. Therefore the value of $C_{i,k}$ selected for minimization of $E_{k,j}$ (for all $J$) and maximization of $E_{h,l}$ (for all $l$) are selected to be $$C_{i,k} = 0 \qquad \text{for } \overline{B}_{i,h} < \overline{A}_{i,k} \qquad [\text{Eq. 11}]$$
$$= \frac{\overline{B}_{i,h} - \overline{A}_{i,k}}{\overline{A}_{i,k}(\sigma_{i,h} + \sigma_{i,k})} \text{ otherwise}$$

Figure 5A:
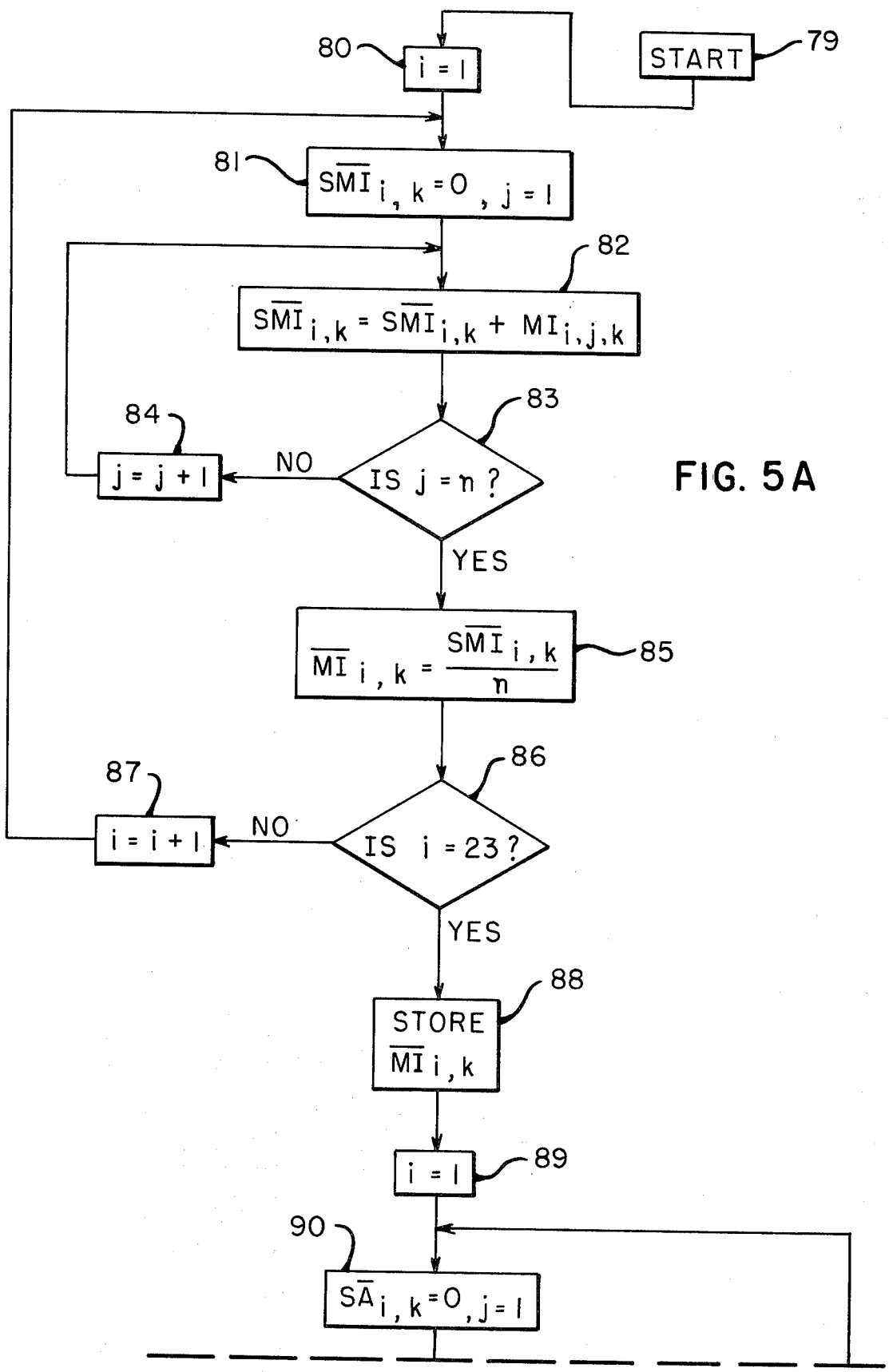
FIGS. 5A, 5B, 5C and 5D illustrate in flow diagram form the operation of a second portion of the system illustrated in FIG. 1.
Figure 5B:
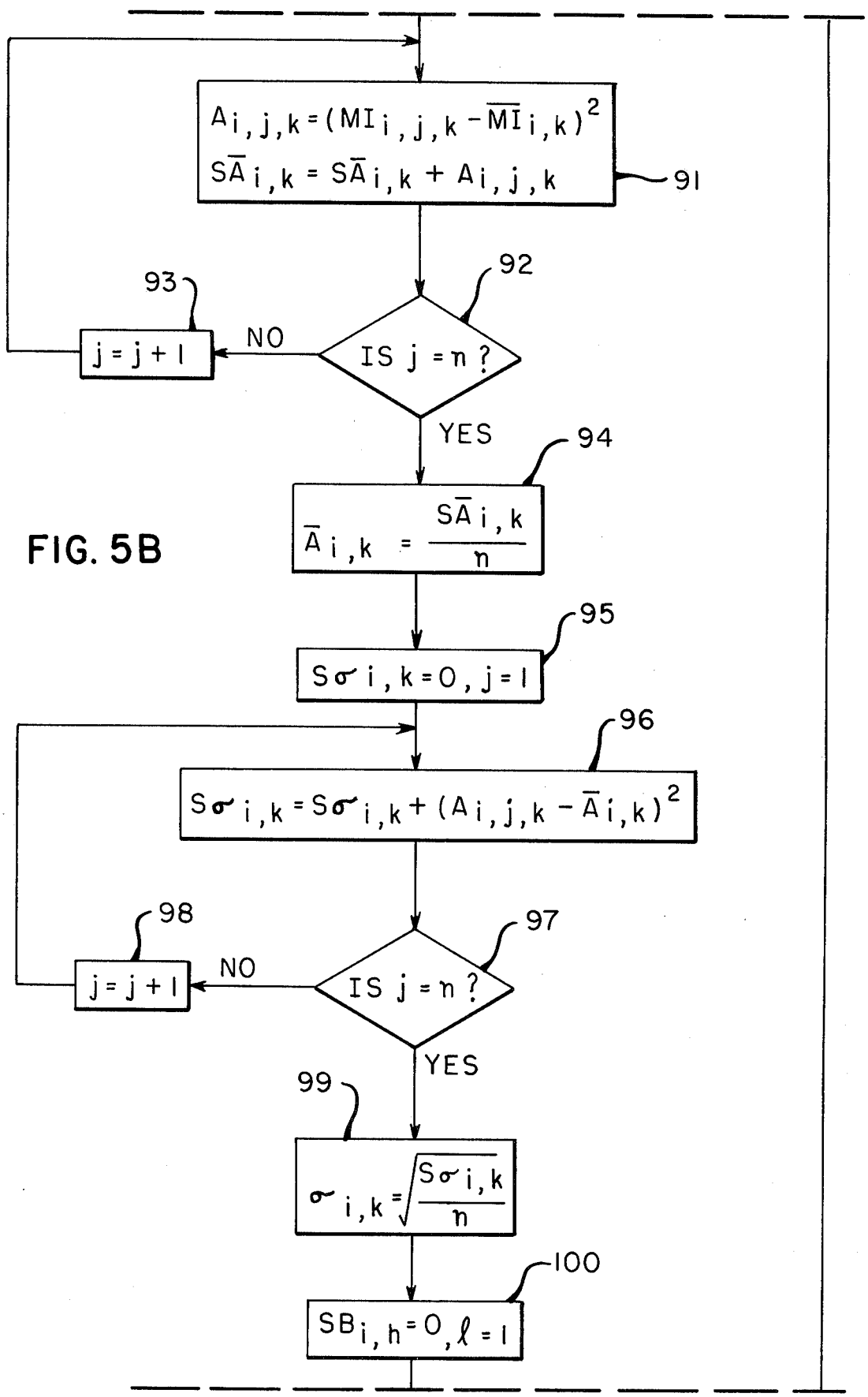
Figure 5C:
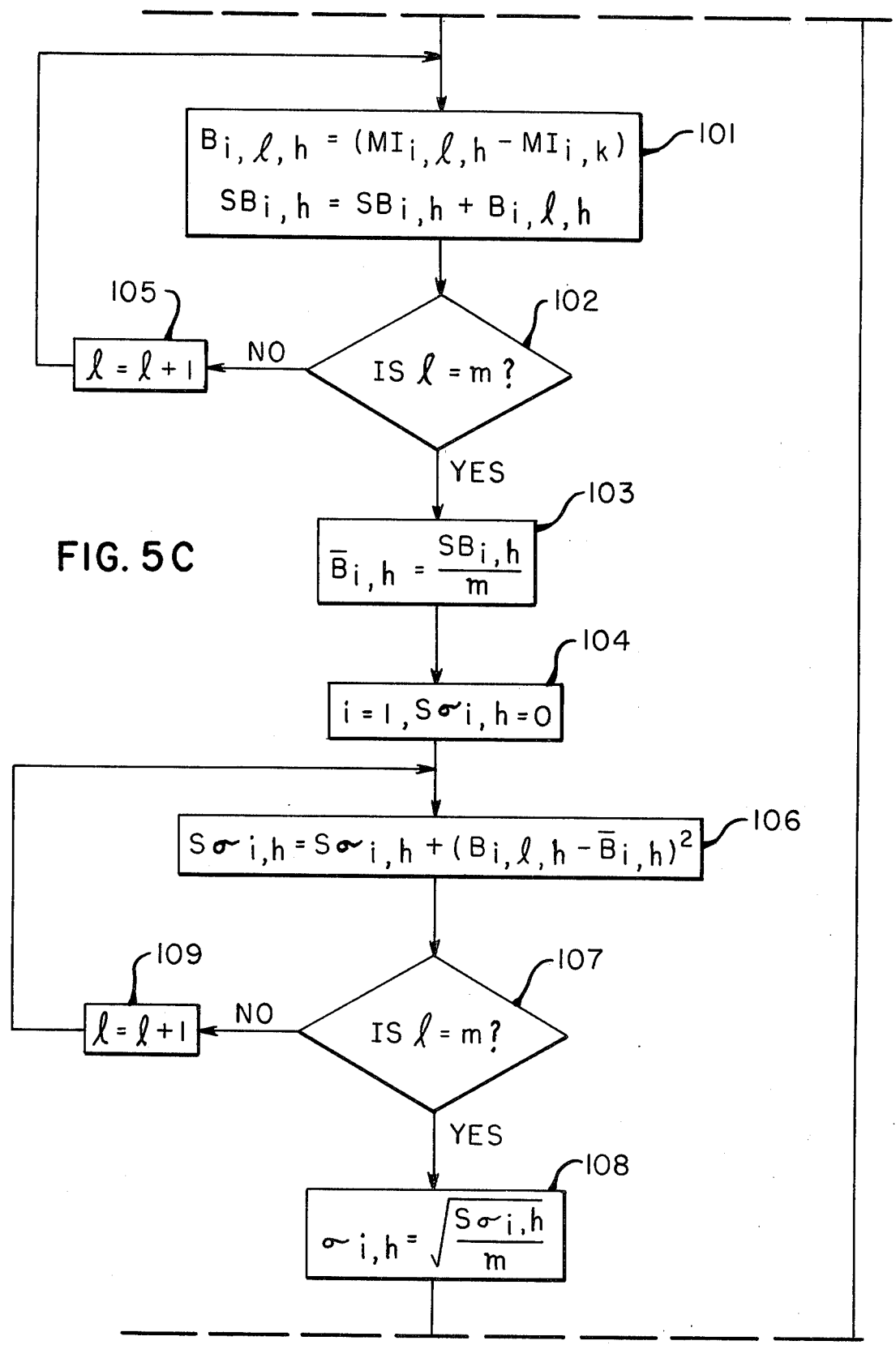
Figure 5D:
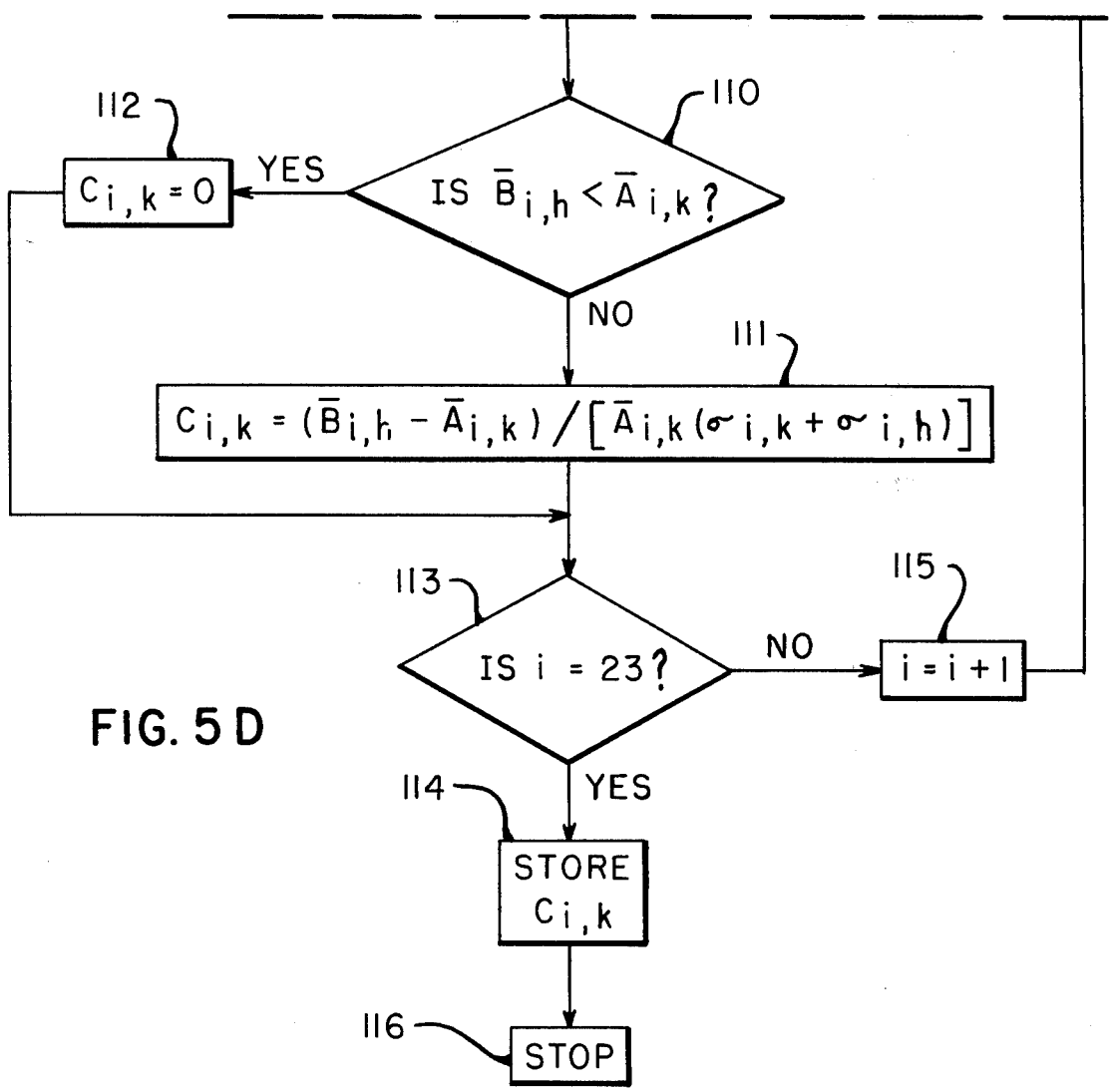

Referring to FIGS. 5A and 5D wherein the flow chart utilized by the analyzer 18 to compute and store portions of the aforementioned equations is shown. The START block 79 activates block 80 to initialize the value of, $i$, to be equal to 1. Block 81 sets the value of $SMI_{i,k}$ equal to zero, and the value of $j$ equal to 1. Block 82 computes the partial sum of $\overline{SMI}_{i,k}$. The action block 83 compares the present value of $j$ against the value for the total number of utterances $n$ to determine if they are equal. If the answer is NO the value of $j$ is incremented by 1 in block 84 and block 82 computes the next partial sum. If $j$ is equal to $n$ the partial sum is complete and box 85 computes the value $\overline{MI}_{i,k}$ using the complete sum from box 82. The action block 86 compares the value $i$ against the number 23 to determine if they are equal. If not the value of $i$ is incremented by 1 in box 87 and fed back to the input to box 81 to initiate the computation of the next value of $\overline{MI}_{i,k}$. When the value of $i$ reaches 23 each of the 23 computed values of $\overline{MI}_{i,k}$ are stored in memory.

Block 89 sets the initial value of $i$ equal to 1. Block 90 responds by setting the value of $SA_{i,k}$ to zero, and the value of $j$ equal to 1.

In block 91 the value of $A_{i,j,k}$ is computed along with the value of $\overline{SA}_{i,k}$. The action block 92 determines if the value of $j$ is equal to $n$ and if not, block 93 increments the value of $j$ by 1 to cause block 91 to compute the next values of $A_{i,j,k}$ and $\overline{SA}_{i,k}$. When the value of $j$ is equal to $n$ block 94 computes the value of $\overline{A}_{i,k}$ utilizing the sum obtained from block 91.

In block 95 the deviation $S\sigma_{i,k}$ is set equal to zero, and the value of $j$ is made equal to 1. Block 96 computes the partial sum of $S\sigma_{i,k}$. Action block 97 determines if the partial sum is complete by determining if the value of $j$ is equal to the value of $n$. If $j$ does not equal $n$ the block 98 increments the value of $j$ by 1 and re-activates block 96 for purposes of computing the next incremented partial sum. When the count of $j$ does equal $n$ the deviation $\sigma_{i,k}$ is computed by block 99.

Blocks 100 to 119 repeat the computations set out by the blocks 90 to 99 to compute the values of $\overline{B}_{i,h}$, $B_{i,h}$ and $\sigma_{i,h}$.

The block 110 determines if the quantity $\overline{B}_{i,h}$ is less than the quantity $\overline{A}_{i,k}$ and if so the weighting factor $C_{i,k}$ is made equal to zero by block 112. If the comparison performed by block 110 results in a NO answer the computation of the value of $C_{i,k}$ is accomplished by block 111. The comparison block 113 compares the value of $i$ to the number 23, if the value of $i$ is less than 23 block 115 increments $i$ by 1 and re-activates blocks 90, to commence the cycle over again for the increased increment of $i$. When $i$ reaches 23 block 113 provides a YES output to block 114 which block operates to store the value of $C_{i,k}$ in memory unit 19. When the storage and computation operations are completed the stop block 116 is activated ending the analysis.

Figure 7:
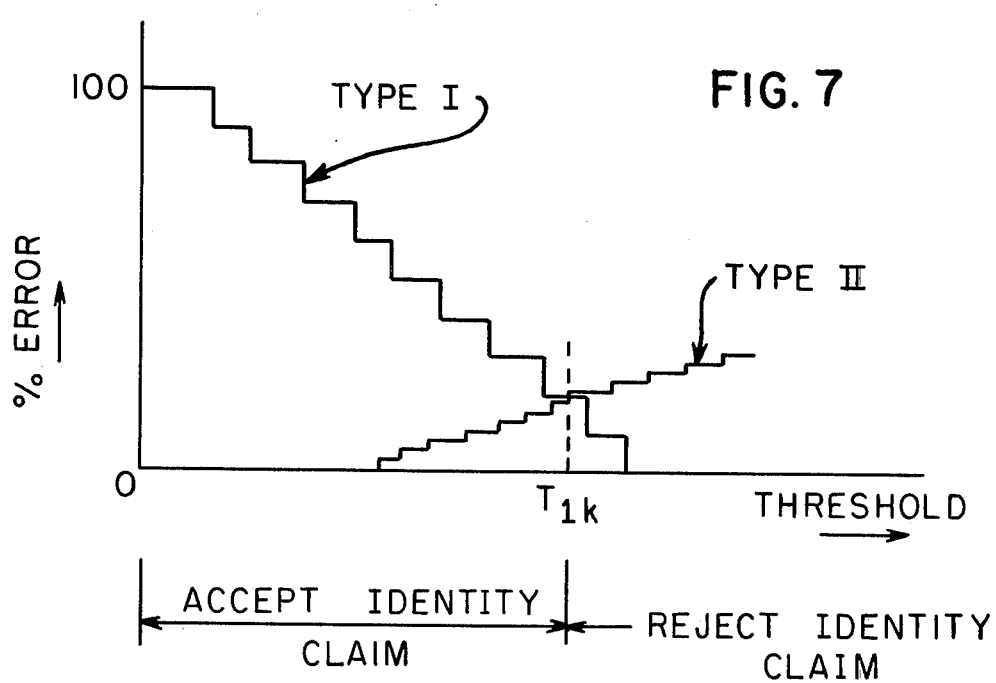
FIG. 7 is a chart illustrating the relationship of two kinds of errors and the choice of a threshold value thereon.

An error threshold value is also stored in unit 19. This threshold value is denoted $T_1k$, for the person $k$. Two distinct types of errors are considered by the system; one is Type I error defined as the rejection of a correct hypothesis, and the other is a Type II error defined as the acceptance of a hypothesis when it should have been rejected. The threshold value $T_1k$, is computed such that the probability of a Type I error is equal to the probability of a Type II error. FIG. 7 illustrates the relationship between Type I and Type II errors.

The error function of Eq. 4 is compared with a threshold value $T_2k$ where $T_2k$ is derived from the value of $T_1k$ by the use of the following relationship:

$$T_2k = \left[\begin{array}{l}\text{owner selected Type I/Type II} \\ \text{error ratio}\end{array}\right] T_1k$$

If the value $E \geq T_2k$ the identity claim of the customer is denied. If the value $E < T_2k$ the identity claim of the customer is verified and the customer is accepted.

The threshold value $T_1k$ is a numerical constant resulting from establishing a 50% ratio between the quantity of errors resulting from comparing Utterance Vectors to other Utterance Vectors of the same person and from comparing Utterance Vectors to the Statistical file vectors.

Each of the $k$-customer data items stored in unit 19 may then be recorded on a credit card by a card writer 20. The credit card is then issued to the customer for his/her use.

In FIG. 8 one preferred embodiment of a speech verification system is shown.

A card reader 21 is designed to read the customer's card and feed the read data to the storage means 22. The three components of the data are the customer's computed moment invariant vector, the weight vector and the value of the computed threshold $T_1k$.

When the data has been read and loaded into the storage means 22 a display 24 is activated requesting the customer to speak the standard phrase. Elements 9, 10, 12 and 14 are identical to the similar numbered elements shown in FIG. 1 and also operate in a similar manner. The customer's standard phrase is thus transformed into an Utterance Vector by computer 14.

The error function is computed in the computer unit 28 from the differences between the components of the moment invariant vector stored in unit 22 and the Utterance Vector computed by unit 14.

The error function is determined by the following equation:

[Eq. 12]
$$E = \sum_{i=1}^{23} C_{i,k}(MI_i - \overline{MI}_{i,k})^2$$

where, $C_{i,k}$ is the $i^{th}$ component of the weight vector for the customer $k$.

The function computed in unit 28 is compared with the threshold value $T_2k$ from the adjustable error ratio means 30. Means 30 receives the stored customer threshold value $T_1k$ and provides a multiplying factor to adjust the threshold value $T_1k$ and provides a multiplying factor to adjust the threshold value $T_1k$ to the level desired by the system owner.

The error function output is compared with threshold value $T_2k$ where $I_2K$ is derived from the $T_1k$ of the identity claim.

The resultant decision from the comparator and decision circuit 31 is displayed on the display 32. If the identity of the customer is denied he/she may be given a number of additional tries to achieve a match before, for example, the card can be captured or ejected from the card reader 21.

While there has been shown what is considered to be the preferred embodiment of the invention, it will be manifest that many modifications may be made therein without departing from the essential spirit of the invention. It is intended, therefore, in the annexed claims to cover all such changes and modifications as may fall within the true scope of the invention.

What is claimed is:

1. The method of verifying the identity of a person by the use of utterance comparisons comprising the steps of:
   a. computing an utterance vector from samples of the person's speech;
   b. computing an utterance vector from samples of an imposter's speech;
   c. analyzing the computed utterance vector of the person and the computed utterance vector of the imposter for deriving weighting factors indicative of the differences therebetween;
   d. recording the person's computed utterance vector and said weighting factors on a security card that is issued to said person;
   e. comparing the utterance vector recorded on said security card against a most recent computed utterance vector from the person for determining the differences therebetween;
   f. comparing the differences determined in step (e) with said recorded weighting factors and verifying the identity of said person if the comparison is within a first range and rejecting the identity of said person if the comparison is within a second range.

2. The method according to claim 1 wherein the steps (a) and (b) are repeated a plurality of times; and average utterance vectors are computed for the computed utterance vectors of step (a) and step (b).

3. The method of verifying the identity of a person by the use of reference utterances comprising:
   a. computing said reference utterance from sets of moment invariants developed from a plurality of different utterances of a phrase by said person;
   b. computing a plurality of imposter utterance vectors from sets of moment invariants developed from a plurality of different utterances of a phrase by a plurality of imposters;
   c. computing an error weighting function of the differences between said reference utterance and said imposter utterance and setting a threshold for acceptance of verification as a function of error in verification; and verifying the identity of said person when the reference utterance is above the set threshold.

4. The method according to claim 2 wherein each of said moment invariants is computed using the following formula:

$$MI_{pq} = \frac{\frac{1}{N} \sum_{i=1}^{N} (X_i - \bar{X})^p (Y_i - \bar{Y})^q}{\left[\frac{1}{N} \sum_{i=1}^{N} (X_i - \bar{X})^2\right]^{p/2} \left[\frac{1}{N} \sum_{i=1}^{N} (Y_i - \bar{Y})^2\right]^{q/2}}$$

where:
$Y_i$ = the digital value of the reference utterance sampled at $X_i$;
$\bar{Y}$ and $\bar{X}$ are the mean values of the distribution of $Y_i$ and $X_i$, respectively;
$N$ = number of samples;
$p + q \leq 6$, where $p$ and $q$ are integers.

5. The method according to claim 3 and further comprising the step of:
   a. recording the person's computed utterance vector on a security card that is issued to said person.

6. The method according to claim 3 wherein the steps (a) and (b) are repeated a plurality of times; and average utterance vectors are computed for the utterance vectors of step (a) and step (b).

7. A system for verifying the identity of an electrical signal comprising:
   means for providing a representation of sampled amplitude values of said electrical signal;
   means for computing moment invariants from said sampled amplitude values;
   storage means for storing a plurality of computed moment invariants representative of imposter electrical signals;
   analyzing means for computing weighting functions indicative of the differences between computed imposter moment invariants and the first named computed moment invariants;
   recording means for recording the computed first named moment invariants and the weighting functions therefor; and
   means for accepting the identity of said electrical signal when moment invariants computed from a non-recorded electrical signal compare with the recorded moment invariants within limits established by said weighting functions.

8. A system for verifying the identity of a person from an utterance of a reference phrase comprising:
   a. means for transforming said uttered reference phrase into electrical signals;
   b. means for sampling said electrical signals and for converting the samples into amplitude values;
   means for operating upon said amplitude values for computing identity moment invariants of said amplitude values;
   d. means for storing said identity moment invariants;
   e. means for storing a plurality of moment invariants corresponding to reference phrases uttered by imposters;
   f. analyzing means operatively connected to said means for storing said identity moment invariants and said means for storing a plurality of imposter moment invariants for deriving factors indicative of the differences therebetween; and
   g. means for recording said identity moment invariants and said derived factors whereby identity of a person is established by comparing the computed identity moment invariants of a reference phrase uttered at a later time against the recorded identity moment invariant when the differences therebetween compare favorably with said derived factors.

9. The system according to claim 8 wherein said means for operating upon said amplitude values computes each moment invariant according to the following formula:

$$MI_{pq} = \frac{\frac{1}{N} \sum_{i=1}^{N} (X_i - \bar{X})^p (Y_i - \bar{Y})^q}{\left[\frac{1}{N} \sum_{i=1}^{N} (X_i - \bar{X})^2\right]^{p/2} \left[\frac{1}{N} \sum_{i=1}^{N} (Y_i - \bar{Y})^2\right]^{q/2}}$$

where:
$Y_i$ = the digital value of said electrical signal sampled at $X_i$;
$\bar{Y}$ and $\bar{X}$ are the mean values of the distribution of $Y_i$ and $X_i$, respectively;
$N$ = number of samples;
$p + q \leq 6$, where $p$ and $q$ are integers.

10. The system according to claim 8 and further comprising:
means for averaging the computed moment invariants corresponding to a similar uttered reference to establish an average moment invariant.

11. A system for verifying the identity of an individual by comparing the individual's previously recorded utterance against a non-recorded utterance and verifying the individual's identity if the comparison is favorable, said system comprising:
means for providing a representation of sampled amplitude values of the individual's utterance;
means for computing moment invariants from said sampled amplitude values;
storage means for storing a plurality of computed moment invariants representative of imposter utterances;
analyzing means for computing weighting functions indicative of the differences between computed imposter moment invariants and computed individual moment invariants;
recording means for recording the computed individual moment invariants and the weighting functions therefor; and means for accepting the identity of said individual when moment invariants computed from an individual's non-recorded utterance compare with the recorded moment invariants within limits established by said weighting functions.

12. The system according to claim 11 wherein said means for computing moment invariants computes each moment invariant according to the following formula:

$$MIpq = \frac{\frac{1}{N}\sum_{i=1}^{N}(Xi - \bar{X})^p(Yi - \bar{Y})^q}{\left[\frac{1}{N}\sum_{i=1}^{N}(Xi - \bar{X})^2\right]^{p/2}\left[\frac{1}{N}\sum_{i=1}^{N}(Yi - \bar{Y})^2\right]^{q/2}}$$

where:
$Yi$ = the digital value of said electrical signals sampled at $Xi$;
$\bar{Y}$ and $\bar{X}$ are the mean values of the distribution of $Yi$ and $Xi$, respectively;
$N$ = number of samples
$p+q \leq 6$, where $p$ and $q$ are integers.

13. The system according to claim 11 and further comprising:
means for averaging the computed moment invariants corresponding to a similar uttered reference to establish an average moment invariant.

14. A system for verifying the identity of a person by the use of utterance comparisons comprising:
means for converting an utterance into a corresponding electrical signal;
means for providing representations of sampled amplitude values of said corresponding electrical signals;
means for computing moment invariants from said provided representations;
memory means for storing said computed moment invariants;
means for storing a plurality of computed moment invariants corresponding to imposter utterances;
analyzing means for computing weighting functions indicative of the differences between the moment invariants of the person to be identified and those of an imposter;
means for comparing subsequent computed moment invariants of the person against previously computed moment invariants for providing representations of the differences therebetween; and
means for comparing said provided difference representations against said computed weighting functions and for providing an acceptance indication when said differences are within acceptable magnitudes.

15. The system according to claim 14 wherein said means for computing moment invariants computes each moment invariant according to the following formula:

$$MIpq = \frac{\frac{1}{N}\sum_{i=1}^{N}(Xi - \bar{X})^p(Yi - \bar{Y})^q}{\left[\frac{1}{N}\sum_{i=1}^{N}(Xi - \bar{X})^2\right]^{p/2}\left[\frac{1}{N}\sum_{i=1}^{N}(Yi - \bar{Y})^2\right]^{q/2}}$$

where:
$Yi$ = the digital value of said electrical signals sampled at $Xi$;
$\bar{Y}$ and $\bar{X}$ are the mean values of the distribution of $Yi$ and $Xi$, respectively;
$N$ = number of samples;
$p+q \leq 6$, where $p$ and $q$ are integers.

16. The system according to claim 14 and further comprising:
means for averaging the computed moment invariants corresponding to a similar uttered reference to establish an average moment invariant.

* * * * *